No. 864,174. PATENTED AUG. 27, 1907.
M. C. & I. C. LANDES.
FLOUR BOLTING MACHINE.
APPLICATION FILED OCT. 8, 1901.

2 SHEETS—SHEET 1.

Witnesses:
H. B. Hallock
R. M. Kelly

Inventors
Milton C. Landes
Isaiah C. Landes
By ____ Atty.

No. 864,174. PATENTED AUG. 27, 1907.
M. C. & I. C. LANDES.
FLOUR BOLTING MACHINE.
APPLICATION FILED OCT. 8, 1901.
2 SHEETS—SHEET 2.
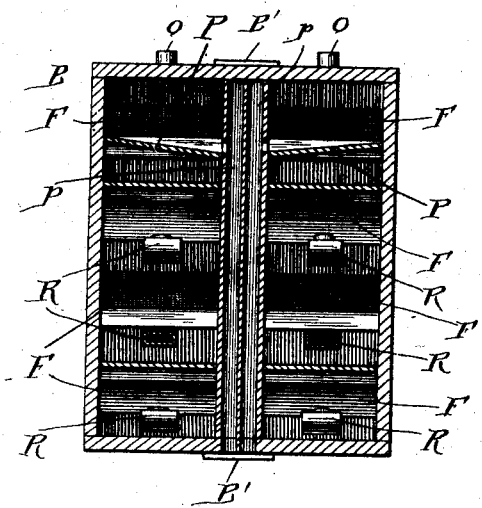
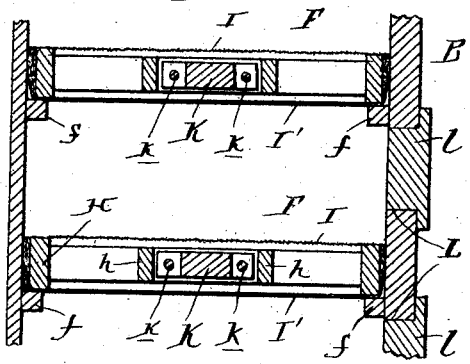
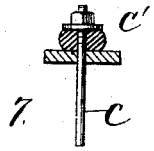
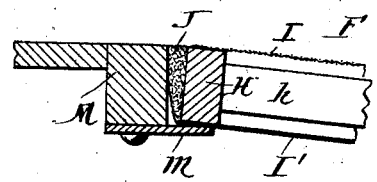
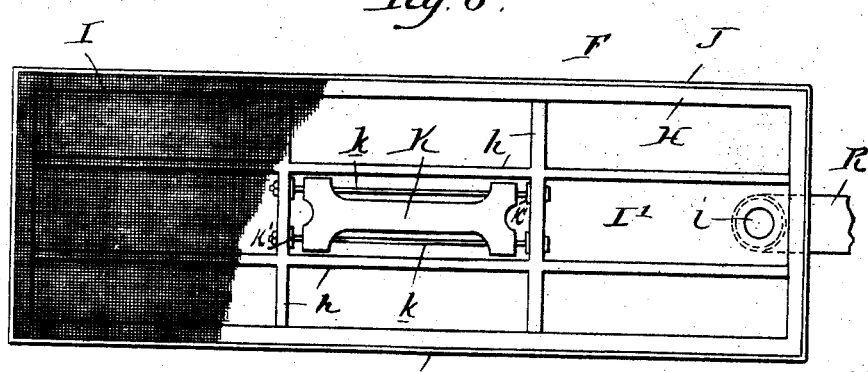

UNITED STATES PATENT OFFICE.

MILTON C. LANDES AND ISAIAH C. LANDES, OF YERKES, PENNSYLVANIA.

FLOUR-BOLTING MACHINE.

No. 864,174.     Specification of Letters Patent.     Patented Aug. 27, 1907.

Application filed October 8, 1901. Serial No. 77,937.

*To all whom it may concern:*

Be it known that we, MILTON C. LANDES and ISAIAH C. LANDES, both of Yerkes, Montgomery county, Pennsylvania, have invented an Improvement in Flour-Bolting Machines, of which the following is a specification.

Our invention has reference to flour bolting machines, and consists of certain improvements all of which are fully set forth in the following specification and shown in the accompanying drawings which form a part thereof:

The object of our invention is to provide a construction of bolting machine in which the sieves may be removed or inserted while the machine is in motion, and such changes be made without specking the flour from admixture of tailings or unbolted particles with the flour.

Our object is also to provide a form of sieve which is cheap to construct, durable in operation, self cleansing and flexibly supported whereby it may prevent leakage and have capacity of slight vibration under the action of a knocker to shake itself clear of any adhering flour.

Our object is further to form the machine in a compact or condensed form and so supported that the sieve box is balanced with freedom of motion horizontally in all directions.

Figure 1:
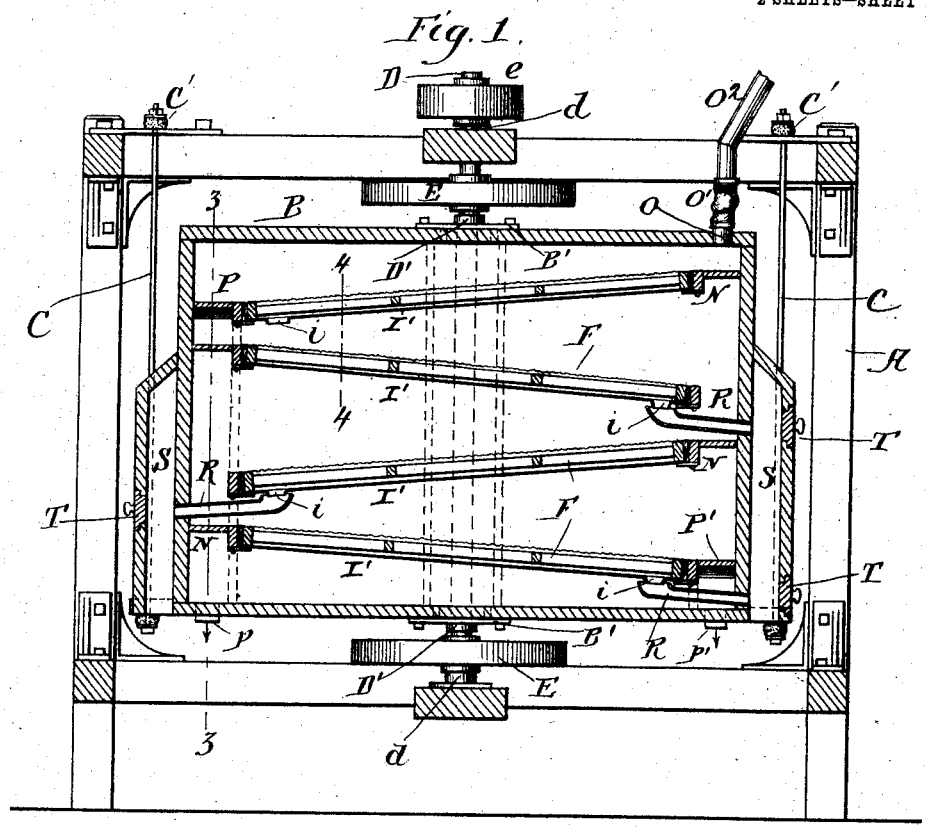
Figure 2:
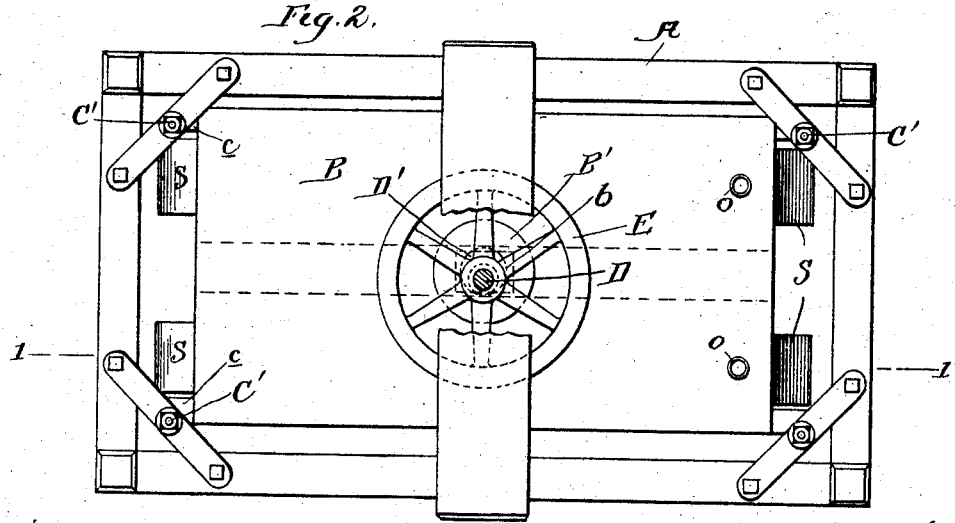

Other objects of our invention will be noted when considering the details of construction, and these will be better understood by reference to the drawings, in which:

Figure 1 is a sectional elevation of a bolting machine embodying our improvements on line 1—1 of Fig. 2; Fig. 2 is a plan view of same; Fig. 3 is a cross section of the sieve box on line 3—3 of Fig. 1; Fig. 4 is a cross section through two of the sieves and a portion of the box on line 4—4 of Fig. 1; Fig. 5 is a longitudinal section on line 5—5 of Fig. 4 through one of the sieves; Fig. 6 is a plan view of one of the sieves; and Fig. 7 is an elevation of one of the flexible hangers for the sieve box.

A is the main frame and is preferably made open and strong.

B is the sieve box and is rectangular in plan and is divided longitudinally formed by a central compartment by the two interior walls $B^2$. The central compartment at the center of the box is divided by cross divisions to form a central chamber $b$ and said chamber is open at top and bottom. This central chamber $b$ has for its object the forming of a space vertically through the box for the passage of the operating shaft D. The two outer or side compartments W contain the sieves F, of which there may be any number desired.

The box B is suspended within the frame A by four rods C, the lower ends of which connect with metal flanges $c$ at the bottom corners of the box, and also connect at the top with extensions from the top of the frame A at its corners. Rubber cushions $C'$ may be employed between the top nuts of these rods C and the top extensions as shown in Fig. 7. It is also evident that bottom springs $C^2$ may be interposed between the lower end or heads of the rods and the flanges of the box. This gives great flexibility and permits the box to swing in all horizontal directions and be yieldingly supported. The springs $C'$ and $C^2$, while acting to sustain the sieve box with elasticity also enables the heads of the rods C and the top nuts to properly seat themselves when the rods C are swung at an incline during the vibrations of the box.

The sieve box is given a gyrating motion by the following devices:—A shaft D extends vertically through the central chamber $b$ of the box B and is journaled at $d$ $d$ in the cross bars of the frame A. It is possible with $d$ in the cross bars of the frame A. It is possible with eccentrics $D'$ $D'$ which act upon plates $B'$ $B'$ secured at top and bottom of the box and at the ends of the chamber $b$. In this way the rotation of the shaft D will cause the box B to swing horizontally with a gyrating motion. The shaft D may be rotated by a band wheel $e$ and is provided with balance wheels E E to impart steadiness to its motion. The nuts $C^3$ of the rods C may be screwed to a greater or less extent upon the rods and thus elevate or lower the box B relatively to the eccentrics on the shaft D, and by which adjustment the said eccentrics can be insured working upon the bearings $B'$ on the box.

The sieves F consist of rectangular frames H having light cross bracing bars of wood of slightly less height than the screen frames H. The frames H are covered on the top with the bolting cloth or screen I and on the bottom with the paper or smooth textile material floor $I'$ which has a discharge opening $i$ at one end, namely the lowest end when in use. Secured about the perimeter of this sieve frame H is a strip of felt J, preferably thicker at the top than at the bottom for the purpose of enabling the sieve to fit down more readily in its support and insure more flexibility with respect to lateral jarring while at the same time making a flour tight joint. The bracing framework $h$ is of less depth than the outside or main frame H of the sieve so as to permit of a space between said bracing frame and the screen I and floor $I'$, the latter being especially necessary for permitting the flour to freely pass to the lower end and outlet $i$. Located in one or more of the squares formed by the cross bracing is located a knocker K consisting of a rectangular block of wood or other light material and supported upon two wires $k$, $k$. Pieces of leather $k'$ at the ends of the wires act as buffers and against these the knocker block strikes while reciprocating upon the supporting wires. The vibratory motion given to the box B carrying the sieves insures the motion necessary to cause the knockers K to continually jar the sieve frame and clear it of adhering flour.

The sieve constructed as above described is simple, cheap to construct, durable, light, efficient and not liable to get out of order. It combines with the sieve or screen element, the collecting floor which has heretofore been made separate and fixed; and is of such shape that it is easily handled and capable of insertion in or removal from the machine when in motion. These sieves F are supported upon oblique side strips $f$ upon the side walls of the chamber W and at the ends they are held longitudinally by cross bars M and supported by flanges secured to said cross bars and consisting of plates $m$. The sides of the box B is provided with a series of openings arranged a little above each sieve and of the same or a little greater length so as to permit easy removal of the sieves when necessary. As shown these openings L are larger at one end than the other and are closed by removable doors $l$. This allows the greatest possible opening into the interior of the box. The bottom of the openings L are somewhat above the tops of the sieves to form a wall to properly hold and guide the flour and prevent its spilling through the apertures L.

The material to be bolted is received by a chute $O^2$ from the stones or rollers and is delivered to the bolting machine by flexible tube $O'$ and tube O opening through the top of the box B at one end. This material is received upon a board N from which it passes upon the upper or tailing sieve F. When it has been treated by this sieve the tailings pass on to the inclined floor P and are guided transversely to the chute $p$ and discharged, and the middlings separated by the sieve are guided by the oblique floor I′ to the lower end and discharged upon a second sieve F and by gravity and the shaking of the machine works their way to the lower end. The flour collected by the floor of this sieve is discharged into a tube R leading through the end wall of the box B and discharged into a vertical flour tube S from which it may be delivered in any of the well known ways. The unbolted middlings pass over the end of the sieve and fall upon the board N as in the case of the first mentioned sieve and from this it passes on to the next sieve F. From the discharge end of this sieve the flour passes by a tube R into the vertical flour tube S′ upon the opposite end of the box B to that provided with the other flour tube S, and the middlings pass down to the next sieve F. If this is the last sieve of the series, the flour is passed by a tube R into the flour tube S and the tailings are passed upon a tail-board P′ and fed laterally into the discharge chute $p'$.

While we have shown four sieves, namely one tailing sieve and three middlings sieves, we do not confine ourselves to any number as more or less may be employed as desired. We have also described the construction of the sieves in the chamber W upon one side of the box B and it is to be understood that there is a similar construction upon the other side of box B. In fact it is evident that, if it is desired to give great capacity to a machine having a single driving mechanism, these sets of sieves may be duplicated still further within the same box B. The flour may be sampled as it leaves each sieve and enters the tubes S, S′, by simply removing the covers T of the handholes in said tubes.

While we prefer the construction as shown the minor details thereof may be modified without departing from the spirit of the invention.

Having now described our invention, what we claim as new and desire to secure by Letters Patent, is:

1. In a bolting machine, a rectangular sieve box containing two series of sieves separated by a central aperture through the box, and also vertical discharge chutes between them which chutes are also outside of the central aperture, suspension devices for flexibly suspending the box, a straight shaft extending through the central opening, and eccentrics on the shaft for vibrating the sieve box about the shaft.

2. A sieve box of a bolting machine, combined with a series of removable bolting sieves arranged one above the other and wholly inclosed within the box and the adjacent sieves having opposite obliquity and each of said sieves having formed fixedly therewith a lower flour collecting floor of the same obliquity as the sieve having a discharge opening at one end, independent covered openings through the side of the sieve box immediately above and to the side of each sieve for removing the sieves, soft packing around the sieves below the independent covered openings, means to supply the flour to the sieve box, and chutes to remove the flour extending below the floors of the sieves.

3. In a bolting machine, the combination of a sieve box having a series of sieve supporting flanges within it, power devices for vibrating it horizontally in all directions, a series of removable sieve frames arranged within the box and supported one above the other upon the supporting flanges, a soft packing arranged between the outer vertical edges of the sieve frames and the sieve box whereby they are flexibly supported in a lateral direction, and a knocker carried upon each sieve for imparting to it an independent vibration.

4. In a bolting machine, the combination of a sieve box having a series of sieve supporting flanges within it, power devices for vibrating it horizontally in all directions, a series of removable sieve frames arranged within the box and supported one above the other upon the supporting flanges and each having a flour collecting floor arranged below the sieve, a felt packing arranged between the outer vertical edges of the sieve frames and the sieve box whereby they are flexibly supported in a lateral direction, and a knocker carried upon each sieve for imparting to it an independent vibration.

5. A sieve for a bolting machine consisting of the combination of the outer frame provided with cross bracing of less height than the width of the outer frame, a sieve or screen stretched over the top of the frame and above the cross bracing, and a smooth flour collecting floor or bottom of paper stretched over the bottom of the frame at a distance below the cross bracing and having a discharge opening, and a knocker carried upon the framing of the cross sieve structure between the screen and floor to jar it during its shifting movements.

6. A sieve for a bolting machine, the combination of a sieve box, with a sieve consisting of the outer frame, a sieve or screen stretched over the top of the frame, and a smooth flour collecting floor or bottom of a smooth, vibratable material stretched over the bottom of the frame and having a discharge opening, and a surrounding felt packing upon the perimeter of the outer frame fitting against the sieve box to make a flour tight joint.

7. A sieve for a bolting machine consisting of a main frame, a sieve or screen stretched over the frame, and a bounding packing of felt about the main frame and of greater thickness at the top than at the bottom, in combination with a knocker carried by the main frame and adapted to vibrate it, and a sieve box or case adapted to receive the sieve and coact with the felt to make a tight but yielding joint whereby the knocker may vibrate the sieve within the box.

8. In a bolting machine, the combination of the sieve 864,174 box B having the end flour tubes S, S' and side tailing chutes p, p', means to vibrate the sieve box, a series of sieves F having screens I and flour collecting floors I', flexible packing J between the sieves and box, floors P and P' for guiding the tailings from the first and last sieves of the series into the chutes p and p', floors N for receiving the middlings from one sieve and delivering it to the next, and tubes R for receiving the flour from the collecting floors of the sieves and delivering it to the flour tubes S, S'.

9. In a bolting machine, the combination of the sieve box B having the end flour tubes S, S' and side tailing chutes p, p', means to vibrate the sieve box, a series of sieves F having screens I and flour collecting floors I', flexible packing J between the sieves and box, removable doors l in the side of the sieve box slightly above the level of each sieve, knockers carried by each sieve for vibrating it, floors P and P' for guiding the tailings from the first and last sieves of the series into the chutes p and p', floors N for receiving the middlings from one sieve and delivering it to the next, and tubes R for receiving the flour from the collecting floors of the sieves and delivering it to the flour tubes S, S'.

In testimony of which invention, we have hereunto set our hands.

MILTON C. LANDES.
ISAIAH C. LANDES.

Witnesses:
ISAIAH C. REIFF,
IRVIN H. DETWILER.